(No Model.) 2 Sheets—Sheet 1.
J. A. HOCKETT.
POWER STORING MECHANISM FOR ELECTRIC LOCOMOTIVES.
No. 463,315. Patented Nov. 17, 1891.
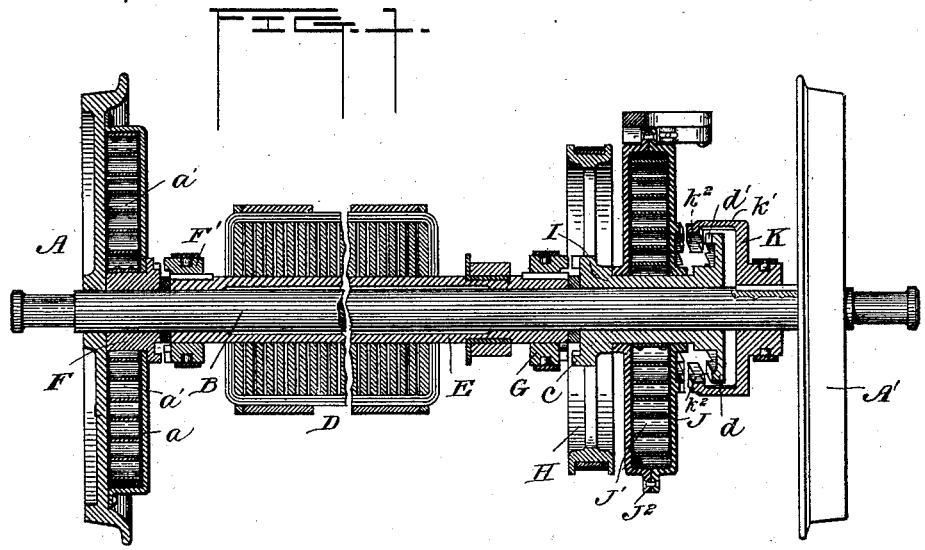
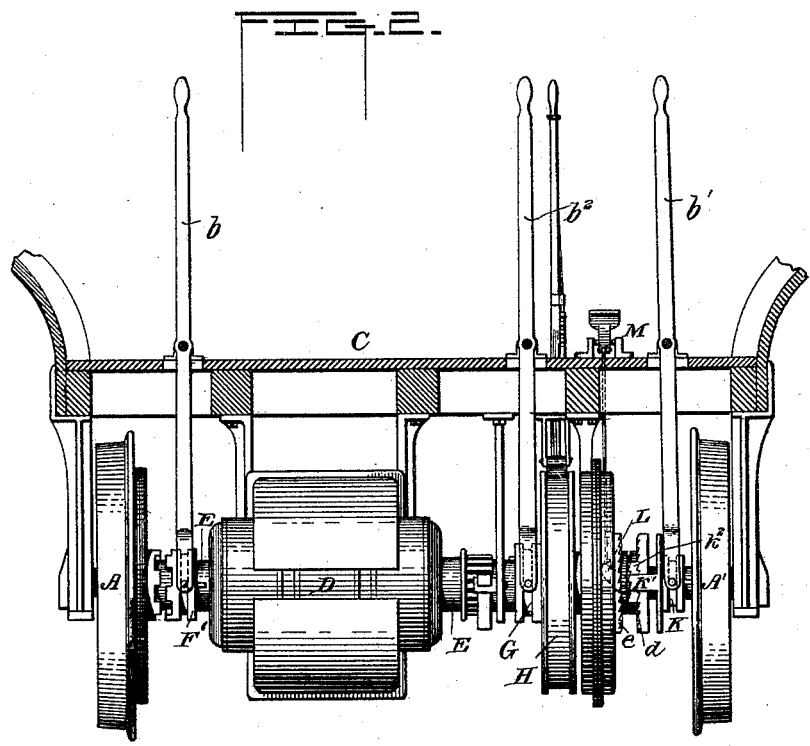
WITNESSES
INVENTOR
James A. Hockett
By Butterworth Hall & Brown
his attorneys.

(No Model.) 2 Sheets—Sheet 2.

J. A. HOCKETT.
POWER STORING MECHANISM FOR ELECTRIC LOCOMOTIVES.

No. 463,315. Patented Nov. 17, 1891.

WITNESSES  INVENTOR
James A. Hockett
By Butterworth Hall & Brown
his attorneys

UNITED STATES PATENT OFFICE.

JAMES A. HOCKETT, OF STIRLING, KANSAS.

POWER-STORING MECHANISM FOR ELECTRIC LOCOMOTIVES.

SPECIFICATION forming part of Letters Patent No. 463,315, dated November 17, 1891.

Application filed October 22, 1890. Serial No. 368,926. (No model.)

*To all whom it may concern:*

Be it known that I, JAMES A. HOCKETT, a citizen of the United States, residing at Stirling, in the county of Rice and State of Kansas, have invented certain new and useful Improvements in Power-Storing Mechanism for Electric Locomotives; and I do hereby declare the following to be a full, clear, and exact description of the invention, such as will enable others skilled in the art to which it appertains to make and use the same.

My invention relates to improvements in electric locomotives of the character employed in street-car service and railways; and the object of the invention is to provide simple means for storing power to be utilized in starting the car, and also to provide means for applying the power of the motor to the car through a yielding connection which permits the propelling force to be gradually applied to the car through such connection between the axle and motor, instead of directly to the axle, which latter method often results in injury to or breakage of the motor when the full power of the same is suddenly exerted in transmitting motion through a rigid unyielding connection.

To this end my invention consists in the improved construction and arrangement of parts hereinafter described, and particularly pointed out in the claims at the end of this specification.

Figures 3, 4:
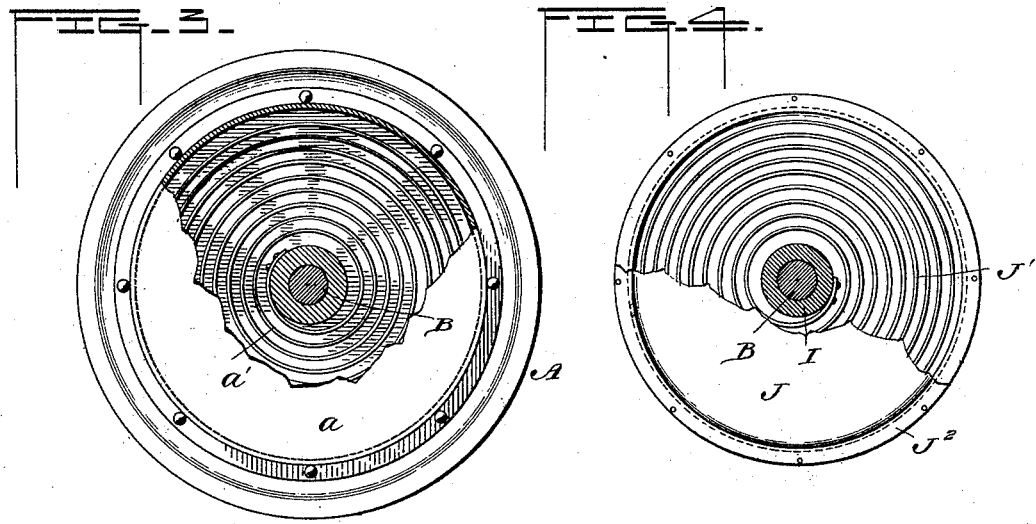
Figure 5:
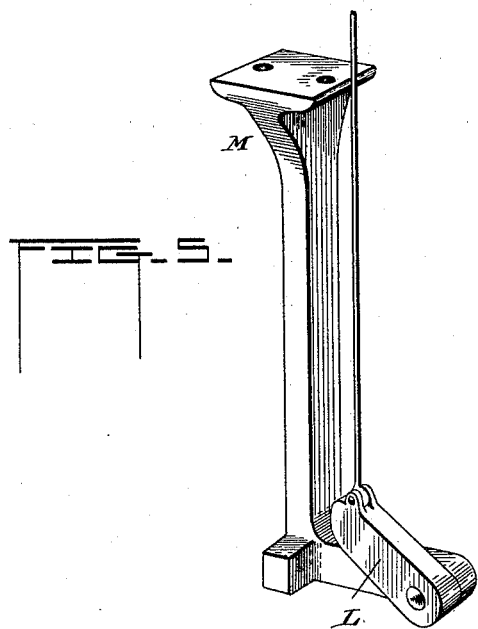

In the accompanying drawings, to which reference is made, Figure 1 represents a horizontal section, and Fig. 2 a front elevation, partly in section, of an electric locomotive embodying my invention. Fig. 3 is a similar view through the casing, which contains the spring which forms a yielding connection between the motor and the car-axle. Fig. 4 is a detail sectional view taken on a line passing through the casing which contains the spring for storing power, and Fig. 5 is a detail showing the gravity-pawl for holding the power-storing spring when wound.

Like letters of reference are used to designate like parts in each of the several figures.

A A' represent the wheels, B one of the axles, and C the ordinary frame-work of an electric locomotive, on the axle or axles of which is placed an electric motor or motors provided with an armature D, having a hollow shaft E, through which the axle B passes. The wheel A' may be connected to the axle in any suitable manner, either rigidly or by means of a pawl-and-ratchet device that will allow the axle to be rotated in a backward direction without revolving the wheel therewith; but the wheel A is arranged to turn loosely on the axle when the latter is rotated in either direction. In order to provide a yielding connection between the motor which drives the car and the axle to which power is applied, I place upon the axle a loose sleeve F, to which is attached one end of a coiled or other suitable spring $a'$, the other end of which is attached to a support which is fixed to the wheel A, such support preferably consisting of an inclosing casing $a$, which surrounds the axle and sleeve and is bolted to the wheel. Keyed to the end of the armature-shaft, so as to slide laterally thereon, is a clutch F', which is adapted to engage with the collar or sleeve F, so as to impart motion from the motor through the armature-shaft to the car-axle. This clutch is controlled by a lever $b$, by which it may be slid back and forth, so as to engage or disengage the collar at will. By this construction when the motor is in operation the power of the motor will be transmitted to the axle of the car through the coiled spring $a'$, whereby the force of the motor, instead of being applied directly to the axle and car, will at first be exerted in winding the spring until the resistance thereof is sufficient to overcome the inertia of the car and start the same. Thus the power of the motor will be gradually applied through a yielding resistance instead of directly to the axle or car, as in motors of this class heretofore in use. On the opposite end or at any convenient point on the armature-shaft is placed the clutch G, which is adapted to engage the teeth $c$ on the hub of a brake-wheel H, which hub may be cast solid with the elongated sleeve I, which is formed with an annular flange $d$ at its opposite end provided with teeth $d'$. On the sleeve I is placed a casing J, within which is inclosed a coil or other suitable spring J', one end of which is attached to the elongated sleeve I, while the other end is attached to the periphery of the casing. This casing is adapted to rotate independently of the sleeve or together therewith when the two are locked together, accordingly as it is disengaged or engaged by a clutch K, which is placed upon the axle and connected therewith by a spline and groove, so as to revolve with the axle, but be capable of independent movement back and forth thereon, being controlled by a lever $b'$. This clutch K is formed with an annular flange $k'$, which overlaps the flange $d$ on the sleeve I, and which has depending therefrom toothed portions $k^2 k^2$, which are adapted to be engaged at one side with the toothed flange $d$, or at the other side with the teeth $e$ on the annular casing J. The casing J is also provided with an annular projecting rim or flange $J^2$, which travels in the path of a gravity pawl or latch L, which is pivoted to the frame and to a rod connecting the same with a foot-lever M, by which the pawl may be disengaged when desired. Normally this pawl rests against the flange upon the casing and holds the spring when wound, but allows the casing to turn in a backward direction when the spring is being wound.

Any suitable brake mechanism may be employed in connection with the brake-wheel H; but I preferably use an ordinary band-brake connected to a suitable operating-lever, as shown in the drawings, which is a simple and inexpensive arrangement.

The clutch G is controlled by a lever $b^2$, by which it may be readily moved back and forth on the end of the hollow armature-shaft in order to engage or disengage the brake-wheel at will.

The operation of this portion of my invention is as follows: To wind the spring before starting the car, the motor is reversed and the current turned on, the clutch G being meanwhile engaged by the teeth in the brake-wheel, and the power of the motor will then be exerted in winding the spring, the friction-pawl L being adapted to permit of this movement; but on the reverse movement of the casing this pawl will impinge against the flange $J^2$ and hold the casing, so as to prevent the spring from unwinding. When the spring is once wound and everything is in readiness to start the car, this can be accomplished by releasing the brake and turning on the current in the usual way, whereupon the force of the spring $J'$, together with that of the motor, will be exerted in starting the car, the power being applied to the axle through the spring $a'$, which is coiled in an opposite direction to the spring $J'$. When it is desired to stop the car, the clutch K will be made to engage the casing, and the brake being then applied the momentum of the car on ordinary grades and except when going up steep hills will serve to wind the spring by the time the car stops. Inasmuch as the axle revolves loosely in its bearing in the wheel A, the spring $a'$ will not be affected by the rotation of the axle when the clutch is disengaged therefrom. This spring serves simply as a yielding connection between the axle and the motor when the clutch $F'$ is in engagement with the collar F, so as to apply the force of the motor in driving the car. By the use of the spring $J'$, I am enabled to store the full power of the motor, so that the same will be utilized in starting the car, and hence a five-horse-power motor will do the work of a ten-horse-power motor as now used, as more power is required to start the car than is necessary to propel it when it is once in motion. If desirable, more than one spring may be used to form the yielding connections or for the purpose of storing power, and it is obvious that a mere duplication of the parts above described in the reverse order of arrangement would serve to transmit power to the axle of the car, so as to propel the same in either a forward or backward direction.

Among the advantages gained by the use of my invention which may be enumerated are the following:

First, by the use of the hollow armature connected to the axle of the car by means of the clutch and interposed spring I provide an indirect yielding connection which allows the power of the motor to be gradually applied in starting the car with perfect safety to the motor, which is not the case when the force of the motor is exerted on a rigid unyielding connection. I also dispense with the use of cogged gearing, and save loss of power resulting from friction and from the wear and breakage of the gear.

By means of my power-storing device I also make storage-batteries practical on railway-cars by reducing the number of cells required in order to have sufficient power to start the car and a corresponding diminution of the weight.

Furthermore, by the use of the described power-storing mechanism the full power of the motor may be automatically stored by the momentum of the car in stopping, the resistance of the spring serving also as a brake to assist in stopping the car.

Without limiting myself to the exact features of construction, which may be varied in a number of ways and still be within the scope of my invention, I claim as new and desire to protect by Letters Patent—

1. The combination, with an electric locomotive, of an electric motor having a tubular armature-shaft journaled on the axle of the car, the car-wheel loosely fitted on the said axle, a clutch device, and a yielding device or spring connecting the loose wheel and clutch, whereby the power of the motor may be gradually applied to the wheel for the purpose of propelling the car, substantially as described.

2. The combination, with the axle or axles of the car, having one or more fixed and one or more loose supporting-wheels, the electric motor having a tubular armature-shaft arranged in the axle, a clutch device, and a spring or yielding connection between the loose wheel and clutch, substantially as described, whereby the propelling force of the motor may be gradually applied to the wheel, substantially as described.

3. The combination, in an electric locomotive, of the car, the axle having a fixed and a loose supporting-wheel arranged thereon, an electric motor, a clutch device, a lever controlling the same, and a yielding connection between the wheels and the clutch, substantially as described.

4. In combination with the car, the motor, and suitable mechanism connecting the motor with the driving wheels or axle, a power-storing device, and clutch mechanism for connecting and disconnecting the power-storing device with either the motor or the car, whereby either the force of the motor or the momentum of the car may be utilized in storing power, substantially as described.

5. In combination with the car, the motor, and mechanism connecting the motor with the driving wheels or axle, a power-storing device comprising a casing journaled on a sleeve placed on the car-axle, a spring connecting said casing and sleeve, a brake attached to said sleeve, a clutch adapted to connect the brake and motor, and a second clutch adapted to connect the axle with said casing or said sleeve, substantially as described.

6. In combination with the car, the motor, and mechanism connecting the motor with the axle of the car, the elongated sleeve loose on said axle, the casing loose on said sleeve, the spring having one end attached to said casing and the other end attached to said sleeve, and the sliding clutch keyed on said axle and adapted to be thrown into engagement with the sleeve or the casing at will, substantially as described.

7. A power-storing device for an electric locomotive, comprising an elongated sleeve to be placed loosely on the driving-axle, a brake, a casing fitted loosely on said sleeve, a spring having one end attached to said casing and the other end attached to said sleeve, and a clutch adapted to slide upon the axle, so as to be thrown into engagement with either the sleeve or the casing, substantially as described.

8. In combination with the power-storing device, constructed substantially as described, the casing having the annular projecting flange, and the frictional pawl or latch adapted to automatically engage the casing by frictional contact therewith and prevent the recoil of the spring after winding the same, substantially as described.

9. In combination with the car, the electric motor, the tubular armature-shaft supported on the axle of the car, the loose wheel, the toothed collar, the spring having one end attached to said collar and the other end attached to said wheel, and the sliding clutch keyed to the tubular armature-shaft and adapted to engage with said collar, substantially as described.

10. In combination with the car, one or more driving-wheels, and an axle or axles, the electric motor, the tubular armature-shaft arranged on said axle, the elongated sleeve with brake attachment and toothed portion, also loose on said axle, the peripherally-flanged casing fitted on said sleeve, the power-storing spring, the double-toothed sliding clutch keyed on said axle and adapted to engage with either the casing or the toothed sleeve, and the pivoted friction-pawl adapted to engage the flange upon the casing, substantially as described.

11. In combination with the car, the electric motor having its armature journaled on the car-axle, a loose and a fixed wheel on said axle, mechanism for yieldingly connecting and disconnecting said axle and loose wheel, and a power-storing device, together with suitable clutch mechanism for engaging and disengaging said device at will, whereby the motor or the momentum of the car may be utilized for storing power, substantially as described.

In testimony whereof I affix my signature in presence of two witnesses.

JAMES A. HOCKETT.

Witnesses:
P. P. TRUEHEART,
J. B. LINDSLEY.